United States Patent
Viraraghavan et al.

(10) Patent No.: US 11,182,097 B2
(45) Date of Patent: Nov. 23, 2021

(54) LOGICAL DELETIONS IN APPEND ONLY STORAGE DEVICES

(71) Applicant: International Business Machines Corporation, Armonk, NY (US)

(72) Inventors: Praveen Viraraghavan, Chicago, IL (US); Ethan Wozniak, Cook, IL (US); Amit Lamba, Buffalo Grove, IL (US)

(73) Assignee: International Business Machines Corporation, Armonk, NY (US)

(*) Notice: Subject to any disclaimer, the term of this patent is extended or adjusted under 35 U.S.C. 154(b) by 128 days.

(21) Appl. No.: 16/411,196

(22) Filed: May 14, 2019

(65) Prior Publication Data

US 2020/0363979 A1 Nov. 19, 2020

(51) Int. Cl.
*G06F 3/06* (2006.01)
*G06F 11/10* (2006.01)

(52) U.S. Cl.
CPC .......... *G06F 3/0652* (2013.01); *G06F 3/0604* (2013.01); *G06F 3/067* (2013.01); *G06F 3/0644* (2013.01); *G06F 3/0659* (2013.01); *G06F 11/1076* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 9,244,768 B2 | 1/2016 | Volvovski | |
| 9,417,917 B1 | 8/2016 | Barber | |
| 9,749,414 B2 | 8/2017 | Resch | |
| 10,120,579 B1 | 11/2018 | Patiejunas | |
| 10,417,190 B1* | 9/2019 | Donlan | G06F 16/10 |
| 10,496,318 B1* | 12/2019 | Danilov | G06F 3/0605 |
| 2005/0055519 A1* | 3/2005 | Stuart | G06F 16/125 |
| | | | 711/159 |
| 2013/0275391 A1* | 10/2013 | Batwara | G06F 16/125 |
| | | | 707/689 |
| 2014/0046909 A1* | 2/2014 | Patiejunas | G06F 11/1076 |
| | | | 707/687 |

(Continued)

OTHER PUBLICATIONS

Mell et al., "The NIST Definition of Cloud Computing", National Institute of Standards and Technology, U.S. Department of Commerce, Special publication 800-14, Sep. 2011, 7 pages.

*Primary Examiner* — Kaushikkumar M Patel
(74) *Attorney, Agent, or Firm* — Aaron N. Pontikos

(57) ABSTRACT

A computer-implemented method includes receiving a plurality of storage requests to store a plurality of objects in a dispersed storage network. The computer-implemented method further includes transforming each object in the plurality of objects into a set of error encoded slices. The computer-implemented method further includes dispersing each error encoded slice in each set of error encoded slices to a memory zone of a distinct storage unit. The computer-implemented method further includes co-locating two or more error encoded slices in a common memory zone of a storage unit based, at least in part, on an expiry time associated with the two or more encoded slices. The computer-implemented method further includes logically deleting the common memory zone of the storage unit after all error encoded slices stored in the common memory zone have expired.

14 Claims, 5 Drawing Sheets

(56) References Cited

U.S. PATENT DOCUMENTS

| | | | |
|---|---|---|---|
| 2015/0242326 A1* | 8/2015 | Jayaprakash | G06F 12/0862 |
| | | | 711/137 |
| 2016/0179386 A1* | 6/2016 | Zhang | G06F 3/0688 |
| | | | 711/103 |
| 2016/0224423 A1* | 8/2016 | Grube | G06F 3/067 |
| 2019/0377512 A1* | 12/2019 | Hodes | G06F 3/0652 |
| 2020/0097396 A1* | 3/2020 | Hoshino | G06F 3/0679 |
| 2020/0167360 A1* | 5/2020 | Rath | G06F 3/0644 |
| 2020/0174678 A1* | 6/2020 | Hallak | G06F 3/0659 |

* cited by examiner

LOGICAL DELETIONS IN APPEND ONLY STORAGE DEVICES

BACKGROUND

The present invention relates generally to the field of object storage, and more particularly to logical deletion of objects in append only storage devices.

Object storage (i.e., object-based storage) is a computer data storage architecture that manages data as objects, as opposed to other storage architectures such as file level storage (where data is managed as files in a file hierarchy) and block level storage (where data is managed as blocks of fixed size). Each object typically includes the data itself (i.e., an uninterpreted sequence of bytes), associated metadata (an extensible set of attributes describing the object) and a unique identifier for locating the object. With object storage, blocks of data that make up a file are kept together in addition to maintaining associated metadata to that file, thereby eliminating the hierarchical structure used in file level storage.

Append only storage devices keep an entire history of all changes, deletes and updates to data written to a storage device. With append only storage, data is sequentially written to zones (i.e., data partitions or logical blocks) of a predetermined, fixed size. When data stored in a zone needs to be altered (i.e., updated, modified or deleted), a new version of the data is written to a new zone and the old version is marked invalid. When deleting data from append only storage, a logical delete is performed, whereby the data is flagged as "deleted," but physically remains on the storage device. Accordingly, the memory allocated to the data becomes invalid (i.e., the associated memory is no longer referenced by an index).

SUMMARY

According to one embodiment of the present invention, a computer-implemented method is disclosed. The computer-implemented method includes receiving a plurality of storage requests to store a plurality of objects in a dispersed storage network. The computer-implemented method further includes transforming each object in the plurality of objects into a set of error encoded slices. The computer-implemented method further includes dispersing each error encoded slice in each set of error encoded slices to a memory zone of a distinct storage unit. The computer-implemented method further includes co-locating two or more error encoded slices in a common memory zone of a storage unit based, at least in part, on an expiry time associated with the two or more encoded slices. The computer-implemented method further includes logically deleting the common memory zone of the storage unit after all error encoded slices stored in the common memory zone have expired.

According to another embodiment of the present invention, a computer program product is disclosed. The computer program product includes one or more computer readable storage media and program instructions stored on the one or more computer readable storage media. The program instructions include instructions to receive a plurality of storage requests to store a plurality of objects in a dispersed storage network. receiving a plurality of storage requests to store a plurality of objects in a dispersed storage network. The program instructions further include instructions to transform each object in the plurality of objects into a set of error encoded slices. The program instructions further include instructions to disperse each error encoded slice in each set of error encoded slices to a memory zone of a distinct storage unit. The program instructions further include instructions to co-locate two or more error encoded slices in a common memory zone of a storage unit based, at least in part, on an expiry time associated with the two or more encoded slices. The program instructions further include instructions to logically delete the common memory zone of the storage unit after all error encoded slices stored in the common memory zone have expired.

According to another embodiment of the present invention, a computer system is disclosed. The computer system includes one or more computer system includes one or more computer processors, one or more computer readable storage media, and program instructions stored on the computer readable storage media for execution by at least one of the one or more processors. The program instructions include instructions to receive a plurality of storage requests to store a plurality of objects in a dispersed storage network. receiving a plurality of storage requests to store a plurality of objects in a dispersed storage network. The program instructions further include instructions to transform each object in the plurality of objects into a set of error encoded slices. The program instructions further include instructions to disperse each error encoded slice in each set of error encoded slices to a memory zone of a distinct storage unit. The program instructions further include instructions to co-locate two or more error encoded slices in a common memory zone of a storage unit based, at least in part, on an expiry time associated with the two or more encoded slices. The program instructions further include instructions to logically delete the common memory zone of the storage unit after all error encoded slices stored in the common memory zone have expired.

DETAILED DESCRIPTION

Figure 1:
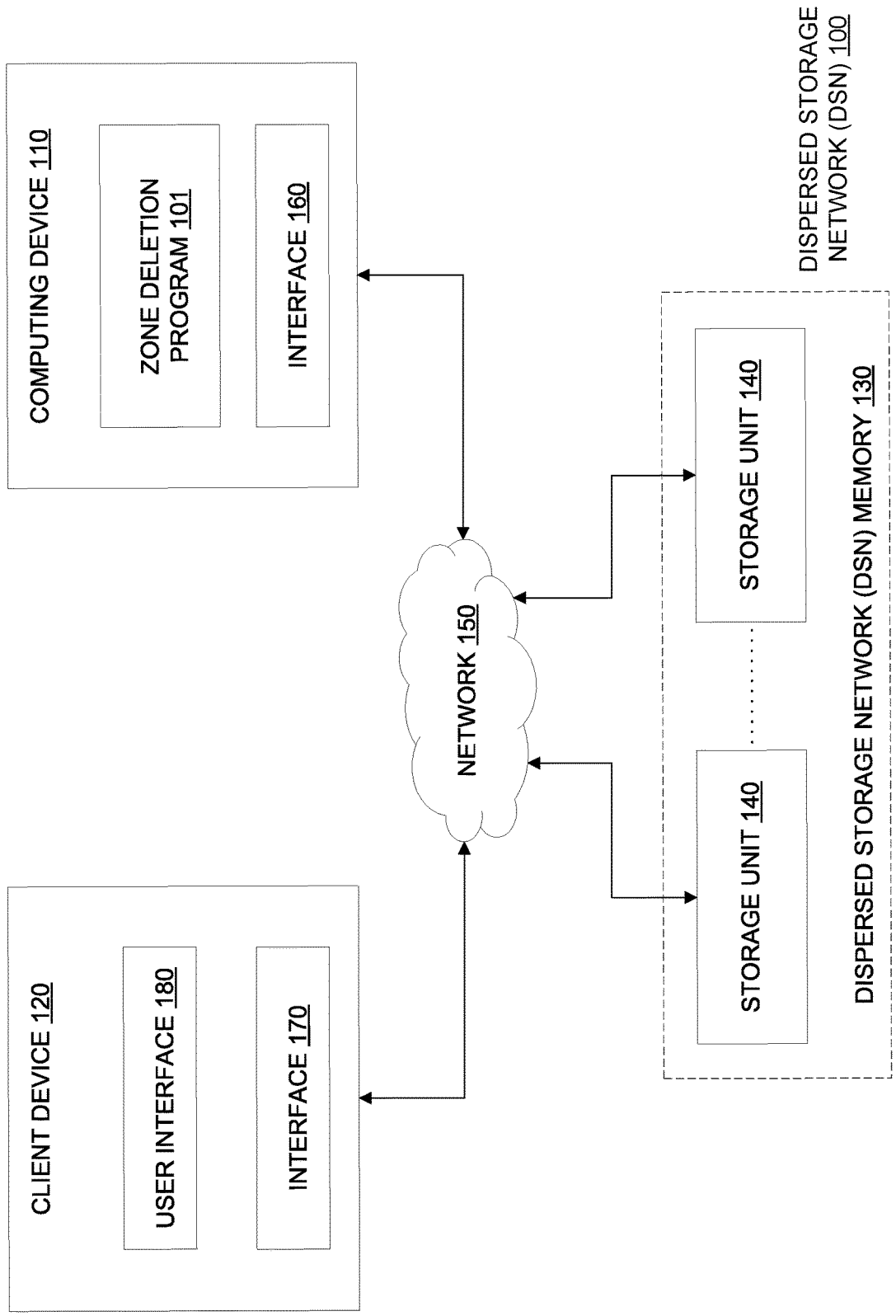
FIG. 1 is a functional block diagram of a dispersed storage network (DSN), generally designated 100, suitable for operation of a zone deletion program 101 in accordance with at least one embodiment of the invention.

Typically, an append only storage device (AOSD) is configured such that objects are co-located within a zone (i.e., a data partition or logical block) of a storage device based on their arrival time. Accordingly, objects that are newly created or updated (regardless of any relationship between two objects) are appended to the next contiguous free memory space in a zone based on the time in which an HTTP request (e.g., POST, GET, PUT, PATCH and DELETE) is received. For example, if a POST operation for Object "A" is received at 10:30:02 and a PATCH operation for Object "B" is received at 10:30:03," then the data associated with Object "A" is written first to the next contiguous free memory space in a zone and a new version of the data associated with Object "B" is written to the next contiguous free memory space in the zone after Object "A." If a zone does not contain enough free memory space for an entire object, a first portion of the object is written to a first zone and the remaining portion of the object is written to a next sequential zone.

Embodiments of the present invention recognize that although co-locating objects in a zone based on arrival time may be optimal for write performance of a storage device, it is not optimal for delete performance. This stems from the fact that objects have to be individually deleted across multiple zones (resulting in an excessive amount of table lookups and delete operations), which ultimately is an inefficient use of computing resources for various append only storage devices, such as solid state storage, hard disk storage and tape media.

Embodiments of the present invention further recognize that co-locating objects that have expiration times (i.e., scheduled logical deletions) in a zone based on arrival time results in an increase in the amount of time and computing resources required to reclaim the physical memory space of a hard disk drive or solid state drive occupied by objects that have been logically deleted. In order to reclaim physical memory space (i.e., free up invalid memory), the memory space ultimately needs to be reformatted. However, prior to reformatting logical blocks of a hard disk drive or solid state drive, those objects stored on a logical bock that are referenced (i.e., valid objects) must either be: (i) copied and written to an empty logical block on the storage device or (ii) copied and written to a logical block of a second storage device. Only after the valid objects have been transferred to an empty logical block (either on the same storage device or a different storage device), can the logical blocks of the storage device be reformatted. Accordingly, the copying of valid objects between logical blocks on the same storage device or a different storage device during a reclamation process becomes increasingly inefficient when the valid objects are scattered amongst various logical blocks since: (i) a separate index lookup is required to locate each object and (ii) objects must be copied one at a time.

Embodiments of the present invention further recognize that co-locating objects that have expiration times (i.e., scheduled logical deletions) in a zone based on arrival time results in an increase in the amount of time and computing resources required to reclaim the physical memory space of a tape drive occupied by objects that have been logically deleted. Typically, reformatting of a tape media is performed after a large number of objects have been invalidated. This stems from the fact that in order to validate the physical memory space occupied by invalid objects, the entire tape media must be reformatted. However, prior to reformatting a tape media, all of the objects stored on the tape media that are referenced (i.e., valid objects) must be copied to another storage device. Only after all of the valid object have been transferred to another storage device can the tape media be reformatted. Accordingly, copying all of the valid objects from the tape media to a different storage device during a reclamation process becomes increasingly inefficient when the valid objects are scattered amongst various logical blocks of the tape media since: (i) a separate index lookup is required to locate each object and (ii) objects must be copied one at a time.

Embodiments of the present invention improve the performance of logical deletions for objects having expiration times by co-locating objects in zones based on their scheduled expiration time rather than by their arrival time. In embodiments of the invention, expiration information associated with an object is used to compute the zone that the object is stored in. Accordingly, objects having the same expiration time or an expiration time within a predetermined range are co-located in the same zone. For example, objects are placed into the same zone based on the objects having a scheduled expiration time that falls within the same hour, day or week.

Co-locating objects in a zone based on their scheduled expiration time significantly improves the performance of append only storage devices. By co-locating objects in a zone based on their scheduled expiration time in accordance with embodiments of the present invention, individual objects do not have to be deleted across various zones. Instead, delete operations for objects co-located in a zone are deferred until all the objects in a zone have expired. At this point, the entire zone is simply marked as deleted. Thus, the number of table lookups and delete operations performed by an append only storage device is greatly reduced since an entire zone is automatically marked as deleted when no valid objects are located in the zone. Furthermore, since no valid objects remain in a zone marked as deleted, there is no need to perform copy operations to transfer valid objects to an empty zone. Thus, reclamation of the physical memory space of the zone can be performed without requiring any physical access to the storage device itself. This ultimately reduces and/or eliminates any performance impact that the reclamation process has on the operation of the storage device.

Embodiments of the present invention provide for the generation of an improved database structure for append only storage devices that is designed to: (i) improve the way a computer stores, retrieves and deletes data in memory, (ii) allows for more effective storage of data on append only storage devices for performing logical deletions of objects and (iii) improves and/or eliminates the process for reclaiming physical memory space occupied by invalid objects. In these embodiments, the number of table lookups and logical deletions for objects that have expired is minimized during the operation of a storage device by co-locating objects in the same zone based on their scheduled expiration time, thereby improving the performance of the storage device. Furthermore, embodiments of the present invention reduce and/or eliminate the need for physically accessing the storage device when performing a reclaim process since individual objects need not be physically copied from memory, which ultimately improves the performance of the storage device. Moreover, according to embodiments of the present invention, a reclaim process and/or reformatting of hard disk drive, solid state drive or tape media can be performed in a shorter period of time since the need for transferring data to an empty zone on the storage device or to an empty zone on another storage device is significantly reduced and/or eliminated.

Thus, embodiments of the present invention provide a technical solution that generates a net gain in overall performance for the computing system; i.e., the overall amount of computing resources that are consumed: (i) during the performance of logical deletions of data and (ii) during the reclamation of physical memory space when compared to alternative solutions. Such computing resources include, but are not limited to central processor usage, volume of storage, and the like. Those having skill in the art will recognize that embodiments of the present invention reduce the strain, i.e. resource consumption, experienced: (i) during performance of logical deletions of data and (ii) during the reclamation of physical memory space on an append only storage device when compared to alternative solutions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a dispersed storage network (DSN), generally designated 100, suitable for operation of a zone deletion program 101 in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

DSN 100 includes computing device 110, client device 120, DSN memory 130 and storage units 140 interconnected over network 150. In embodiments of the invention, network 150 can be a telecommunications network, a local area network (LAN), a wide area network (WAN), such as the Internet, or a combination of the three, and can include wired, wireless, or fiber optic connections. In embodiments of the invention, network 150 provides network access to object storage, such as storage units 140. Network 150 can include one or more wired and/or wireless networks that are capable of receiving and transmitting data, voice, and/or video signals, including multimedia signals that include voice, data, and video information. In general, network 150 can be any combination of connections and protocols that will support communications between computing device 110, client device 120, DSN memory 130, storage units 140 and other computing devices (not shown) within DSN computing environment 100.

Computing device 110 includes an interface 160 to communicate in a format(s) compatible with zone deletion program 101, client device 120 and storage units 140. For example, interface 160 allows for transmitting data between computing device 110 and storage units 140 in a format compatible to store data to and retrieve data from one or more of storage units 140 using a virtual addressing scheme. For example, the virtual addressing scheme of DSN memory 130 utilizes a virtual address for an object that is stored to and retrieved from DSN 100.

In various embodiments of the invention, computing device 110 is a computing device that can be a standalone device, a management server, a web server, a mobile device, or any other electronic device or computing system capable of receiving, sending, and processing data. In other embodiments, computing device 110 is a server computing system utilizing multiple computers as a server system, such as in a cloud computing environment. In an embodiment, computing device 110 represents a computing system utilizing clustered computers and components (e.g. database server computers, application server computers, web server computers, etc.) that act as a single pool of seamless resources when accessed within DSN 100. In general, computing device 110 represents any programmable electronic device or combination of programmable electronic devices capable of executing machine readable program instructions and communicating with DSN memory 130 and storage units 140 within DSN 100 via a network, such as network 150.

Computing device 110 includes zone deletion program 101. Although zone deletion program 101 is depicted in FIG. 1 as being integrated with computing device 110, in alternative embodiments, zone deletion program is remotely located from computing device 110. For example, zone deletion program 101 may be integrated with one or more storage devices, such as storage units 140.

In embodiments of the invention, zone deletion program 101 receives read request commands from client device 120 to read an object stored in DSN memory 130. In these embodiments, zone deletion program 101 recreates an object from a plurality of dispersed error encoded slices based on, but not limited to one or more of the following: a data decoding protocol (e.g., a threshold number of slices required to re-create the data) and a read threshold number (e.g., a number of encoded slices that must be read in order to decode the data). In various embodiments, zone deletion program 101 retrieves error encoded slices associated with an object from DSN memory 130 utilizing at least one read slice combination assigned to an object for retrieval of the object. In some embodiments, zone deletion program 101 utilizes a second read slice combination (e.g., when more than one read slice combination is assigned) when the first read pillar combination does not result in a successful recreation of an object.

In embodiments of the invention, zone deletion program 101 disperses slices of an object to distinct storage units based, at least in part, on one or more information dispersal algorithms. In embodiments of the invention, zone deletion program 101 transforms an object (through a combination of erasure coding and encryption) into slices such that only a subset of the slices are required to re-create the original data. An erasure code may generally be understood as a forward error correction (FEC) code that transforms a message of k symbols into a longer message with n symbols such that the original message can be recovered from a subset of the n symbols (k symbols). Thus, an erasure code creates "extra data" that allows a user to need only a subset of the data to re-create it.

In embodiments of the invention, zone deletion program 101 receives store request commands and encodes the data included with the store request command in accordance with a plurality of erasure coding parameters. In some embodiments, the plurality of erasure coding parameters can include, but are not limited to one or more of: an encoding function (e.g., an information dispersal algorithm), a data slicing protocol (e.g., data slice size, whether or not data slices are of fixed size, variable size, a number of slices (i.e., pillar width) that should be generated for a particular object, etc.) a data decoding protocol (e.g., a threshold number of slices required to re-create the data), a read threshold number (e.g., a number of encoded slices that must be read in order to decode the data) and a write threshold number (e.g., a number of encoded slices that must be accurately stored before the object is deemed to have been properly stored).

It should be appreciated that by dispersing error encoded data between distinct storage units 140 in accordance with embodiments of the present invention, DSN 100 is tolerant of a significant number of storage unit failures (a number of failures based on a predetermined threshold number of slices required to re-create the data) without loss of data and without the need for a redundant copies of the data. Accordingly, only a subset of storage units 140 needs to be available to fully re-create the data on DSN 100. It should further be appreciated that only one copy of data needs to be maintained in DSN 100.

In various embodiments, zone deletion program 101 co-locates dispersed slices of objects in zones based on their scheduled expiration time rather than by their arrival time. In embodiments of the invention, expiration information associated with an object is used to compute the particular zones of storage units 140 in which each slice associated with the object is stored. Accordingly, dispersed slices of objects having the same expiry time or an expiry time within a predetermined range are co-located in the same zone of a storage unit 140.

Client device 120 allows a user to communicate with zone deletion program 101 via a network, such as network 150. For example, zone deletion program 101 receives a GET request for Object "C" from client device 120 and in turn, re-creates Object "C" from error encoded slices associated with Object "C" dispersed amongst DSN memory 130 on storage units 140. In another example, zone deletion program 101 receives a PATCH request for Object "D" from client device 120. Here, zone deletion program 101 marks the previous version of Object "D" as invalid and in turn, generates a new version of Object "D"-Object "E." In this example, zone deletion program 101 generates a plurality of error encoded slices from Object "E" and disperses the slices amongst DSN memory 130 on storage units 140.

In embodiments of the invention, client device 120 can be a laptop computer, tablet computer, netbook computer, personal computer (PC), a desktop computer, a personal digital assistant (PDA), a smart phone, or any programmable electronic device capable of receiving, sending, and processing data. In general, client device 120 represents any programmable electronic device or combination of programmable electronic devices capable of executing machine readable program instructions and communicating with zone deletion program 101, computing device 110, DSN memory 130, storage units 140 and other computing devices (not shown) within DSN 100 via a network, such as network 150.

Client device 120 includes interface 170 and user interface 180. In various embodiments, interface 170 allows client device 120 to communicate in a format(s) compatible with computing device 110. In various embodiments, user interface 180 can be a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program.

DSN memory 130 includes storage units 140. In embodiments of the invention, storage units 140 are append only storage devices that provide object storage. One of ordinary skill will appreciate that append only storage devices do not change or modify data previously written to the storage device. Rather, prior versions of data are invalidated and new versions of the data are appended to new locations on the storage device when updates, modifications and deletes are made to data. In embodiments of the invention, storage units 140 can include one or more spinning hard disk drives (HDDs), one or more solid-state disk drives (SSDs), one or more tape media and/or any combination thereof. In embodiments of the invention, DSN memory 130 of storage units 140 is segmented into zones (i.e., data partitions or logical blocks) of a fixed storage length or size. For example, the default zone size is 256 KB. In another example, the default zone size is 512 KB. However, one of ordinary skill will appreciate that the default block size can be any predetermined size. It should be noted that although embodiments of the invention are directed towards object storage systems, the invention can also be practiced utilizing other storage systems including, but not limited to block level storage and file level storage. Accordingly, in other embodiments of the invention, storage units 140 can be append only storage devices that provide file level storage or block level storage.

In some embodiments, each storage unit 140 is physically located in a different geographical area (e.g., one storage unit is located at a site in New York, one storage unit is located at a site Florida, etc.). In some embodiments, all storage units 140 are physically located in the same geographical area (e.g., all of the storage units are located in the same datacenter in New York). In some embodiments, storage units 140 are physically located between a combination of different geographical areas and the same geographical area (e.g., there are three pairs of storage units, wherein each pair of storage units is physically located at a site in a different geographical area). One of ordinary skill will appreciated that DSN memory 130 can include any number of storage units 140, any number of geographically distinct sites where storage units 140 are located and any combination thereof.

Figure 2:
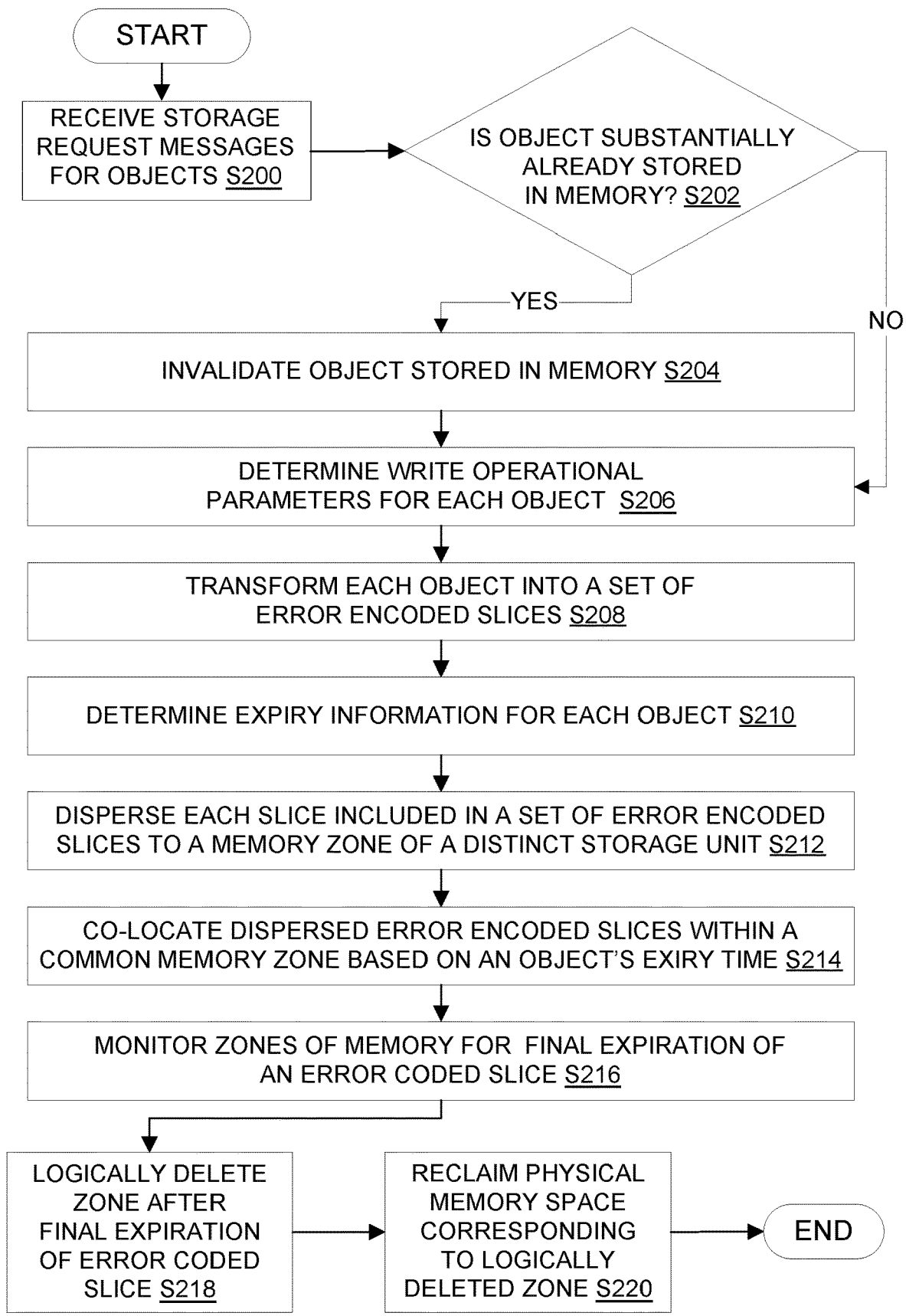
FIG. 2 is a flow chart diagram depicting operational steps for storing slices of objects in zones of DSN memory 130 on storage units 140 of DSN 100 by zone deletion program 101 in accordance with at least one embodiment of the present invention.

FIG. 2 is a flow chart diagram depicting operational steps for dispersing and storing slices of objects in zones of DSN memory 130 on storage units 140 of DSN 100 by zone deletion program 101 in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that slices of data objects stored in DSN 100 are co-located to the same zone of a storage unit 140 based on slices that have a common scheduled expiry time. This is advantageous since an entire zone can be invalidated by performing a single logical delete operation. Thus, index lookups and logical delete operations need not be performed for slices on an individual basis to invalidate a physical memory space occupied by a slice. This is further advantageous since an entire zone can be reclaimed without the need for physically accessing DSN memory 130 of a storage unit 140 to copy valid slices prior to reclaiming the physical memory space corresponding to the zone since the entire zone only includes invalid slices (i.e., slices that are no longer referenced).

At step S200, zone deletion program 101 receives storage request messages from client devices, such as client device 120 depicted in FIG. 1. In various embodiments, a storage request message can include, but is not limited to a store request command (e.g., create, update and delete operations or post, put, and patch operations), a read request command (e.g., read, retrieve or get operations), a user ID, an object name, a data object, a data object identifier (ID), a hash of the data object, a data size, a data type and an expiration time of the data object. For example, client device 120 sends a storage request message to zone deletion program 101 to store a backup of an object in DSN memory 130. It should be noted that although various embodiments of the present invention make reference to the term "object," embodiments of the present invention can also be practiced utilizing any type of data object including, but not limited to data blocks and data files.

At decision step S202, zone deletion program 101 determines if an object included in a storage request message is substantially already stored in memory, such as DSN memory 130 depicted in FIG. 1. In various embodiments, zone deletion program 101 makes a determination based on, but not limited to one or more of the following: comparing the object with stored objects, comparing the object name with object names of stored objects, comparing the hash of the object with the hashes of stored objects, the user ID, the object name, and the data size or the data type. For example, zone deletion program 101 determines that the object is substantially already stored in DSN memory 130 when the hash of the object is the same as a hash of a previously stored object. It should be appreciated that the hash of the object may be received from the requesting device or calculated by zone deletion program 101 upon receiving the object. In another example, zone deletion program 101 determines that the data object is not substantially already stored in DSN memory 130 when the hash of the data is unique with respect to the hash values of those objects already stored.

If zone deletion program 101 determines that an object is substantially already stored in DSN memory 130, zone deletion program 101 proceeds to step S204 (decision step YES branch). If zone deletion program 101 determines that an object is not substantially already stored in DSN memory 130, zone deletion program 101 proceeds to step S206 (decision step NO branch).

At step S204, zone deletion program 101 invalidates an object substantially already stored in DSN memory 130. For example, zone deletion program 101 marks an object as invalid by flipping the value of a bit or several bits (from 0 to 1 or vice versa). In embodiments of the invention, invalidating an object includes invaliding each slice associated with the object. For example, an object is sliced into ten individual slices (i.e., a set of ten slices) and each slice is dispersed and stored in a zone of DSN memory 130 on a distinct storage unit 140. Accordingly, zone deletion program 101 will invalidate each of the ten individual slices associated with the object.

At step S206, zone deletion program 101 determines write operational parameters for an object. In various embodiments, zone deletion program 101 makes a determination based on, but not limited to one or more of the following: an estimation of the number of common users that may store this same object, the user ID, information included in the storage request message, the store request, information included in the one or more predetermined erasure encoding parameters, the object name, the data size, the data type or the hash of the object. For example, zone deletion program 101 determines that the write operational parameters include a pillar width of n=24, a data decoding protocol of n=16, a read threshold number of n=12 and a write threshold number of n=18. In these embodiments, zone deletion program 101 saves the write operational parameters (e.g., so that zone deletion program 101 can retrieve the object). For example, zone deletion program 101 saves the write operational parameters, hash of the object, and data object name in an index that lists the hash values of previously stored objects in DSN memory 130 for reference when subsequently determining if an object is already stored in DSN memory 130. In various embodiments, zone deletion program 101 sends read operational parameters to client device 120 such that the requesting device can retrieve slices from DSN memory 130 to recreate an object.

At step S208, zone deletion program 101 transforms an object into a predetermined number (i.e., set) of error encoded slices. In various embodiments, zone deletion program 101 transforms an object based on one or more of the write operational parameters previously determined in step 208. Zone deletion program 101 creates slice information for each error encoded slice in a set of slices and attaches the slice information to each error encoded slice. For example, the slice information includes a pillar number of the encoded slice (e.g., slice 1 of 10) and an object identifier (ID). It should be appreciated that the slice information functions as, at least part of, universal memory addressing routing information (i.e., a virtual dispersed storage memory address) for the encoded slice for storage and retrieval from DSN memory 130.

At step S210, zone deletion program 101 determines expiry information associated with an object. In some embodiments, expiry information associated with an object is provided in a storage request message transmitted from a client device, such as client device 120 to zone deletion program 101. In some embodiments, zone deletion program 101 makes a determination based on an expiry policy. An expiry policy specifies the amount of time that must pass before an entry is considered expired. For example, the time that must pass can be calculated from the time the data is created, the time from the last access to the data or the time from the last modification and/or update to the data. However, one of ordinary skill will appreciate that an expiry policy can include any number of rules and parameters. In some embodiments, zone deletion program 101 makes a determination based on, but not limited to the following information: an estimation of the number of common users that may store or access this same object, the user ID, information included in the storage request message, the store request, information included in the one or more predetermined erasure encoding parameters, the object name, the data size, the data type or the hash of the object.

In embodiments of the invention, expiry information associated with an object is applied to each error encoded slice that forms the object. For example, if an object has an expiry time of one week after the creation of the object and the object is sliced into a set of ten error encoded slices, each of the ten error encoded slices will have the same expiry time (e.g., one week after creation of the object). In some embodiments, the expiry time is calculated from the time in which a store request message is received. In some embodiments, the expiry time is calculated from the time in which a read or retrieve message is received. In some embodiments, the expiry time is calculated from the time in which transforming an object into a predetermined number of error encoded slices is completed.

At step S212, zone deletion program 101 disperses error encoded slices associated with an object. In embodiments of the invention, zone deletion program 101 disperses error encoded slices based on, but not limited to one or more of the write operational parameters previously determined in step S208. In various embodiments, zone deletion program 101 disperses each error encoded slice included in a set of error encoded slices to a zone of DSN memory 130 located on a distinct storage unit. For example, if Object "F" is sliced into a set of twenty error encoded slices, each slice is stored in a zone of memory on a different storage unit. Similarly, if Object "G" is sliced into a set of thirty error encoded slices, each slice is stored in a zone of memory on a different storage unit. Accordingly, no two error encoded slices from a set of slices are stored in the same zone of memory on a storage unit.

At step S214, zone deletion program 101 co-locates dispersed error encoded slices within a common zone based on an object's expiry time. In embodiments of the invention, zone deletion program 101 co-locates two or more error encoded slices in the same zone of DSN memory 130 on a storage unit 140 based, at least in part, on a slices expiry time. In various embodiments, zone deletion program 101 determines a zone in which to store each error encoded slice based on, but not limited to one or more of the following: (i) the expiry information associated with an object yet to be stored, (ii) expiry information associated with one or more slices currently stored in a particular zone of memory on a storage unit and (iii) expiry information associated with a particular zone of memory on a storage unit.

In some embodiments, zone deletion program 101 stores a slice in a particular zone based on the slice having an expiry time that is substantially similar to an expiry time associated with slices currently stored in a zone. In other embodiments, zone deletion program 101 stores a slice in a particular zone based on the slice having an expiry time that falls within a predetermined range of expiry times associated with slices currently stored in a zone. It should be noted that error encoded slices included in the same set of slices (i.e., the slices used to recreate a particular object) should not be co-located to the same zone of a storage unit as this would defeat the purposes of a dispersed storage network. Rather, each error encoded slice co-located in a common memory zone of a storage unit should belong to a set of slices of a distinct object.

In some embodiments, zone deletion program 101 creates expiry parameters for zones and attaches the expiry parameters to the zone. Expiry parameters may generally be understood as one or more limitations for a zone that govern the particular slices that can be co-located in the zone based on a slice's expiry time. For example, zone deletion program 101 designates Zone 1 of storage unit A as a zone for storing slices having an expiry time on Apr. 25, 2019, Zone 21 of storage unit C as a zone for slices having an expiry time between 10:00 am and 2:00 pm on Apr. 27, 2019, Zone 53 of storage unit F as a zone for slices having an expiry time during the week of Apr. 22, 2019 to Apr. 28, 2019, etc. It should be appreciated that zone deletion program 101 can create any number of expiry parameters for a zone, any types of expiry parameters for a zone, any number of zones having common expiry parameters and/or any combination thereof.

In some embodiments, the number of zones created that have common expiry parameters is based on, but not limited to: (i) the width (i.e., number of slices) associated with an object and (ii) the erasure coding parameters for the object. For example, if an object is sliced into ten slices and the erasure coding parameters dictate that each slice is to be stored on a physically distinct storage unit, then zone deletion program 101 will designate at least ten zones (one zone of memory on ten different storage units) as having expiry parameters that conform with the expiry information associated with the object. In some embodiments, the number of zones created having common expiry parameters is further based on the size of each slice associated with the object. Referring to the previous example, if the zones of DSN memory 130 of storage units 140 are 256 KB in size and each of the ten slices is 512 KB, then zone deletion program 101 will designate at least twenty zones (two zones of memory on ten different storage units) as having expiry parameters that conform with the expiry information associated with the obj ect.

However, it should be noted that zone deletion program 101 may create any number of zones having common expiry parameters irrespective of the number of slices, the size of a slice or the erasure coding parameters for an object to be stored. In an embodiment, zone deletion program 101 proactively creates common expiry parameters for a predetermined number of zones based on historical expiry times associated with objects transmitted to zone deletion program 101 for storage in DSN memory 130. In an embodiment, zone deletion program 101 proactively creates common expiry parameters for a predetermined number of zones based on historical transaction rates (i.e., the rate at which objects associated with particular expiry times) of objects transmitted to zone deletion program 101 for storage in DSN memory 130.

In those embodiments where expiry parameters are not created for zones, if an error encoded slice has an expiry time that is substantially similar to or within a predetermined range of the expiry times associated with slices currently stored in a zone, zone deletion program 101 stores the slice in the zone. However, if an error encoded slice does not have an expiry time that is substantially similar to or within a predetermined range of the expiry times associated with slices already stored in a zone, zone deletion program 101 stores the slice in an empty zone.

In those embodiments where expiry parameters are created for zones, if expiry information associated with an error encoded slice conforms to the expiry parameters associated with a zone, zone deletion program 101 stores the slice in the zone. However, if the expiry information associated with an error encoded slice does not conform to the expiry parameters associated with a zone, zone deletion program 101 stores the slice in an empty, unmarked zone and creates expiry parameters for the zone based on the expiry information associated with the slice. For example, zone deletion program 101 creates an expiry parameter for the zone that matches the expiry time associated with the slice. In another example, zone deletion program 101 creates a set of expiry parameters for the zone having a first time prior to the expiry time associated with the slice and a second time after the expiry time associated with the slice.

At step S216, zone deletion program 101 monitors each zone for the final expiration of an error encoded sliced stored within a zone. It should be noted that in those embodiments where a zone includes slices having associated expiry times that fall within a predetermined range of expiry times, expired data may persist in a zone for a period of time prior to the last expiration time for a slice in the zone being reached. For example, five error encoded slices, each of which are associated with a distinct object, are stored in "Zone X" of DSN memory 130 and have the following expiry times, respectively: Slice 1—05:00 am; Slice 2—10:00 am; Slice 3—4:00 pm; Slice 4—7:00 pm; and Slice 5—"11:00 pm." In this example, Slice 1, Slice 2, Slice 3 and Slice 4 all will have expired prior to the expiration of the last slice (Slice 5) stored in "Zone X." However, Slice 1, Slice 2, Slice 3 and Slice 4 will continue to persist until the last slice (Slice 5) has expired, at which time the entire zone can be logically deleted. Accordingly, until the entire zone is logically deleted, zone deletion program 101 rejects read requests directed to slices of objects that remain stored within a zone of DSN memory 130 after their expiration time. For example, if client device 120 submits a request to read an object that remains stored in DSN memory 130 after expiration of the object, zone deletion program 101 returns a message to client device 120 indicating that the object cannot be read.

At step S218, zone deletion program 101 logically deletes (i.e., soft deletes) a zone after the last remaining object in the zone has expired. In other words, zone deletion program 101 performs a single logical delete operation on an entire zone at a time that is later than or after the last expiration time of a slice stored in the zone. A logical deletion may generally be understood as the flagging or marking of an object stored on a storage device to prevent the object from being selected. It should be noted that once a zone is logically deleted, requests to access an object stored in a logically deleted zone are prevented. Accordingly, objects stored in a zone that has been logically deleted will not be included in comparisons or retrieved in searches. For example, if client device 120 submits a request to read an object stored in a zone that has been logically deleted, zone deletion program 101 returns a message to client device 120 indicating that the object no longer exists.

At step S220, zone deletion program 101 marks a logically deleted zone as available for reclamation of the physical memory space associated with the logically deleted zone. In various embodiments, zone deletion program 101 reclaims the physical memory space corresponding to a logically deleted zone. In some embodiments, a logically deleted zone is reclaimed based on a client's life-cycle management policy. For example, zone deletion program 101 reclaims zones based on predetermined time intervals or a predetermined time designated in a storage life-cycle management policy. In another example, zone deletion program 101 continuously reclaims zones marked as available. In other embodiments, zone deletion program 101 reclaims zones based on receiving a reclaim message from client device 120. In other embodiments, zone deletion program 101 reclaims zones marked as available based on analyzing the workloads of storage units 140. For example, zones marked as available are reclaimed based on a workload (i.e., a percentage of computing resources being utilized) of a storage unit being below a predetermined threshold limit.

Figure 3:
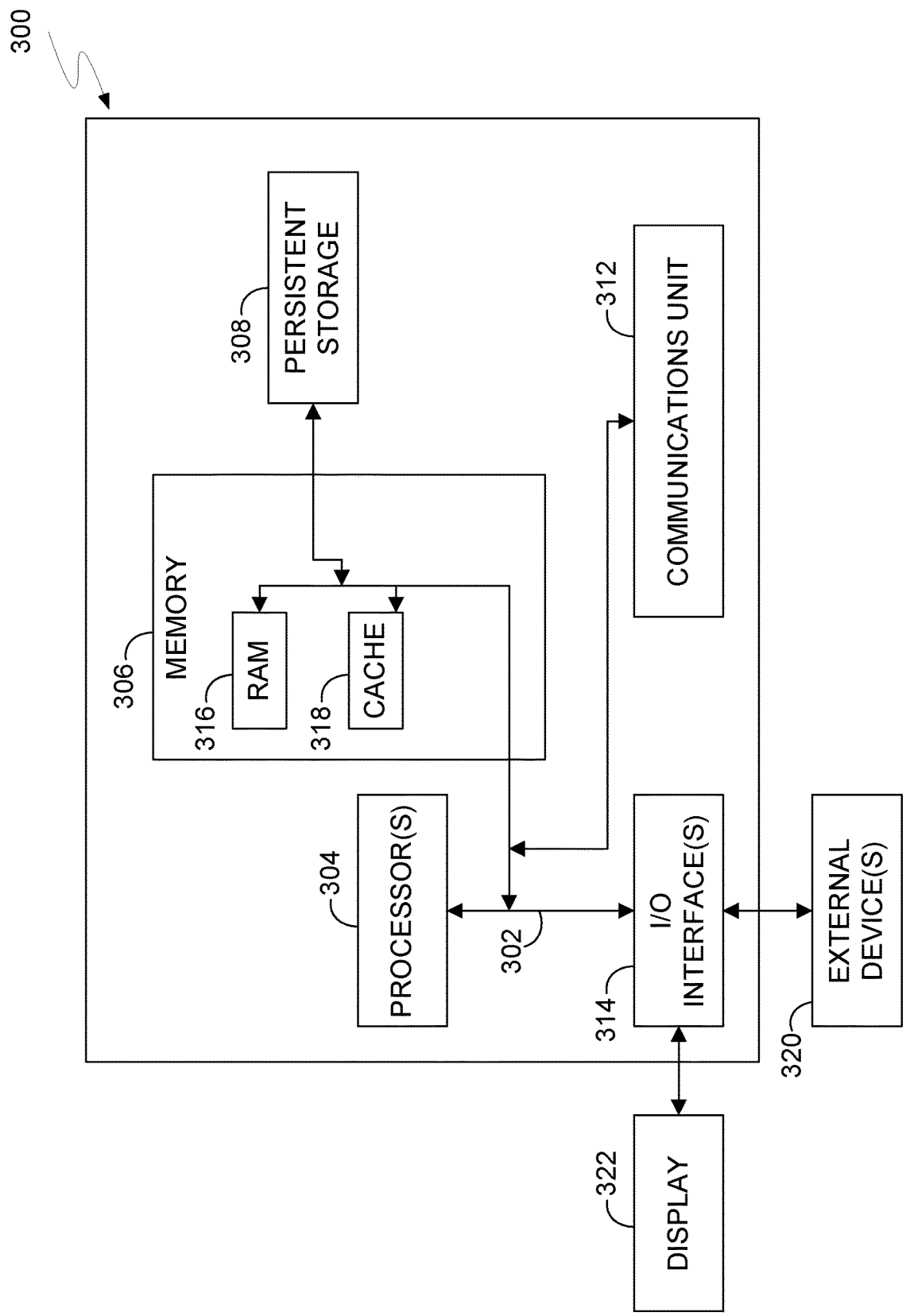
FIG. 3 is a block diagram depicting components of a computing device, generally designated 300, suitable for executing zone deletion program 101 in accordance with at least one embodiment of the invention.

FIG. 3 is a block diagram depicting components of a computer 300 suitable for executing zone deletion program 101 in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interface(s) 314, a display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processor(s) 304 (e.g., microprocessors, communications processors, and network processors), the memory 306, the external device(s) 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for zone deletion program 101 be stored in the persistent storage 308, or more generally, any computer readable storage media, for execution by one or more of the respective computer processor(s) 304 via one or more memories of the memory 306. The persistent storage 308 may be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface(s) 314 may provide a connection to the external device(s) 320, which may be as a keyboard, keypad, a touch screen, or other suitable input devices. External device(s) 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
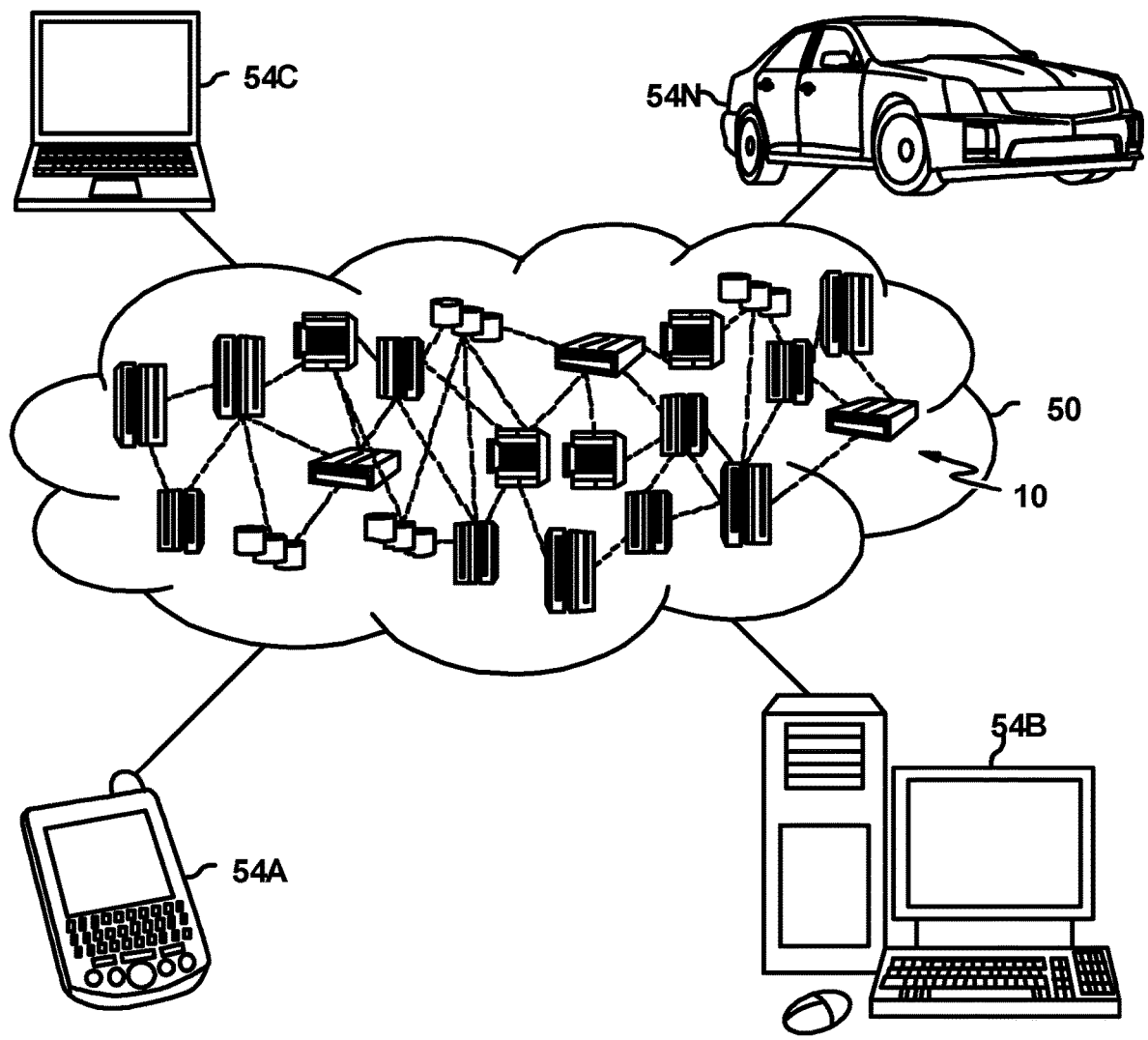
FIG. 4 is a block diagram depicting a cloud computing environment in accordance with at least one embodiment of the present invention.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
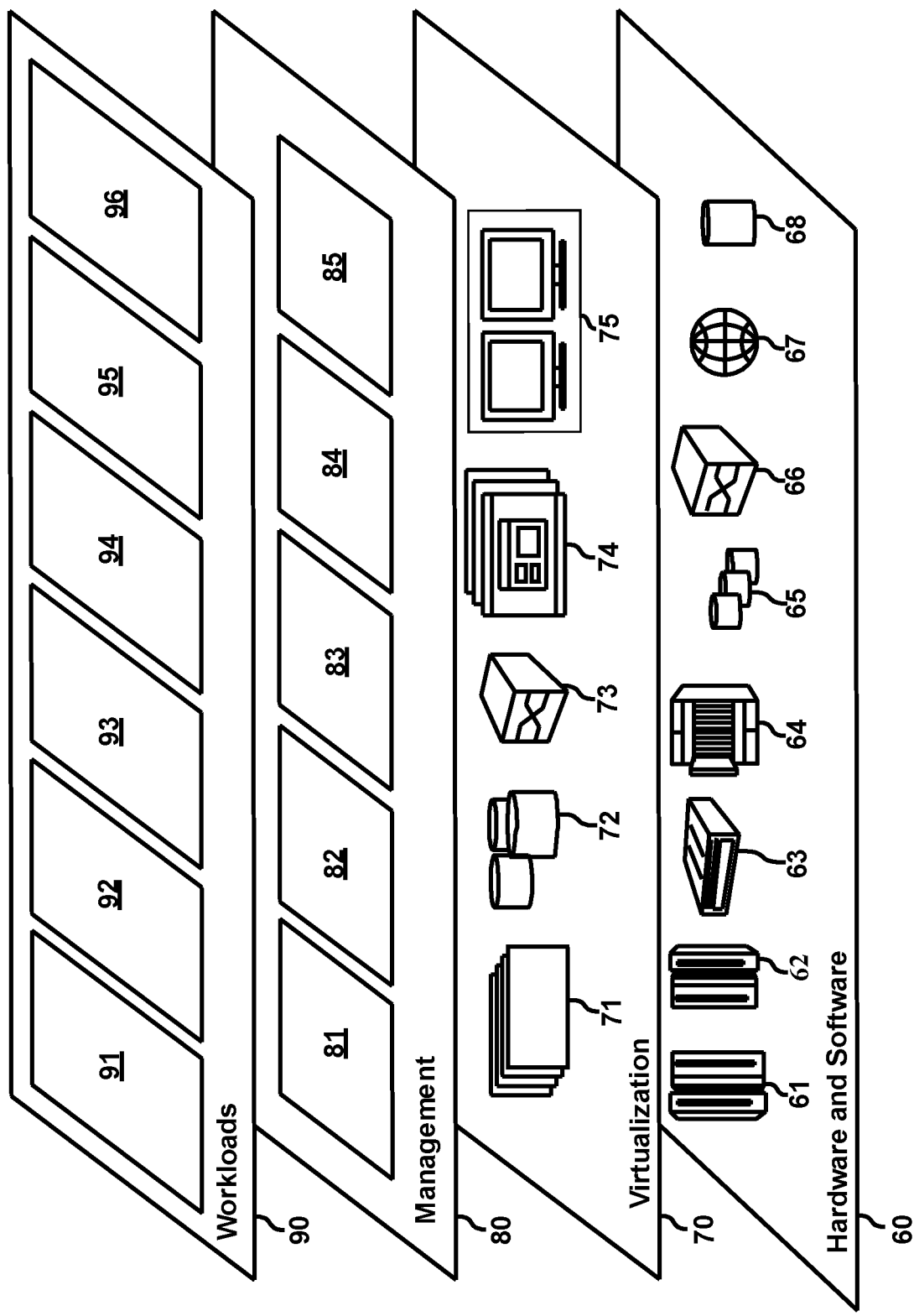
FIG. 5 is block diagram depicting abstraction model layers in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and zone deletion program 101.

What is claimed is:

1. A computer-implemented method comprising:
    proactively creating, by one or more processors, common expiry parameters for a predetermined number of memory zones of one or more storage units of a dispersed storage network based, at least in part, on historical expiry times associated with objects stored in the dispersed storage network;
    transforming, by one or more processors, a first object into a set of error encoded slices;
    dispersing, by one or more processors, each error encoded slice in the set of error encoded slices to a memory zone of a distinct storage unit of a dispersed storage network;
    co-locating, by one or more processors, a first error encoded slice from the set of error encoded slices with a second error encoded slice from a different set of error encoded slices associated with a second object in a common memory zone of a storage unit of the dispersed storage network based, at least in part, on an expiry time associated with the first and second error encoded slices, and an expiry parameter associated with the common memory zone;
    logically deleting, by one or more processors, via a single logical delete operation, the common memory zone of the storage unit after all error encoded slices stored in the common memory zone have expired; and
    reclaiming, by one or more processors, physical memory space corresponding to the logically deleted common memory zone of the storage unit without accessing the physical memory space.

2. The computer-implemented method of claim 1, wherein co-locating the first error encoded slice from the set of error encoded slices with the second error encoded slice from a different set of error encoded slices in the common memory zone of the storage unit of the dispersed storage network is further based, at least in part, on the expiry time of associated with the first and second error encoded slices being within a predetermined range of each other.

3. The computer-implemented method of claim 1, wherein logically deleting the memory zone of the distinct storage unit after all error encoded slices stored in the common memory zone have expired further comprises:
    monitoring, by one or more processors, the common memory zone of the storage unit for a final expiration of an error encoded slice stored in the common memory zone.

4. The computer-implemented method of claim 1, further comprising:
    creating, by one or more processors, one or more expiry parameters that govern which slices can be co-located in a memory zone of a storage unit; and
    attaching, by one or more processors, the one or more expiry parameters to the memory zone of the storage unit.

5. The computer-implemented method of claim 1, further comprising:
    receiving, by one or more processors, a storage request to read the first object stored in the dispersed storage network;
    determining, by one or more processors, that the first object has expired; and
    rejecting, by one or more processors, the storage request to read the first object.

6. The computer-implemented method of claim 1, wherein each distinct storage unit is an append only storage device.

7. A computer program product comprising one or more computer readable storage media and program instructions stored on the one or more computer readable storage media, the program instructions including instructions to:
    proactively create common expiry parameters for a predetermined number of memory zones of one or more storage units of a dispersed storage network based, at least in part, on historical expiry times associated with objects stored in the dispersed storage network;
    transform a first object into a set of error encoded slices;
    disperse each error encoded slice in the set of error encoded slices to a memory zone of a distinct storage unit of a dispersed storage network;
    co-locate a first error encoded slice from the set of error encoded slices with a second error encoded slice from a different set of error encoded slices associated with a second object in a common memory zone of a storage unit of the dispersed storage network based, at least in part, on an expiry time associated with the first and second error encoded slices, and an expiry parameter associated with the common memory zone;
    logically delete, via a single logical delete operation, the common memory zone of the storage unit after all error encoded slices stored in the common memory zone have expired; and
    reclaim, by one or more processors, physical memory space corresponding to the logically deleted common memory zone of the storage unit without accessing the physical memory space.

8. The computer program product of claim 7, wherein the instructions to co-locate the first error encoded slice from the set of error encoded slices with the second error encoded slice from a different set of error encoded slices in the common memory zone of the storage unit of the dispersed storage network is further based, at least in part, on the expiry time associated with the first and second error encoded slices being within a predetermined range of each other.

9. The computer program product of claim 7, wherein the instructions to logically delete the memory zone of the distinct storage unit after all error encoded slices stored in the common memory zone have expired further comprise instructions to:
    monitor the common memory zone of the storage unit for a final expiration of an error encoded slice stored in the common memory zone.

10. The computer program product of claim 7, further comprising instructions to:
    create one or more expiry parameters that govern which slices can be co-located in a memory zone of a storage unit; and
    attach the one or more expiry parameters to the memory zone of the storage unit.

11. The computer program product of claim 7, further comprising instructions to:
receive a storage request to read the first object stored in the dispersed storage network;
determine that the first object has expired; and
reject the storage request to read the first object.

12. The computer program product of claim 7, wherein each distinct storage unit is an append only storage device.

13. A computer system comprising:
one or more computer processors;
one or more computer readable storage media;
computer program instructions;
the computer program instructions being stored on the one or more computer readable storage media for execution by the one or more computer processors; and
the computer program instructions including instructions to:
proactively create common expiry parameters for a predetermined number of memory zones of one or more storage units of a dispersed storage network based, at least in part, on historical expiry times associated with objects stored in the dispersed storage network;
transform a first object into a set of error encoded slices;
disperse each error encoded slice in the set of error encoded slices to a memory zone of a distinct storage unit of a dispersed storage network;
co-locate a first error encoded slice from the set of error encoded slices with a second error encoded slice from a different set of error encoded slices associated with a second object in a common memory zone of a storage unit of the dispersed storage network based, at least in part, on an expiry time associated with the first and second error encoded slices, and an expiry parameter associated with the common memory zone;
logically delete, via a single logical delete operation, the common memory zone of the storage unit after all error encoded slices stored in the common memory zone have expired; and
reclaim, by one or more processors, physical memory space corresponding to the logically deleted common memory zone of the storage unit without accessing the physical memory space.

14. The computer system of claim 13, wherein the instructions to co-locate the first error encoded slice from the first set of error encoded slices with the second error encoded slice from a different set of error encoded slices in a common memory zone of the storage unit of the dispersed storage network is further based, at least in part, on the expiry time associated with the first and second error encoded slices being within a predetermined range of each other.

* * * * *